United States Patent [19]
Watkins et al.

[11] Patent Number: 5,165,979
[45] Date of Patent: Nov. 24, 1992

[54] THREE-DIMENSIONAL POLYMER WEBS WITH IMPROVED PHYSICAL PROPERTIES

[75] Inventors: Sharon L. Watkins, Roswell, Ga.; Hugo P. Watts, Maidstone, England

[73] Assignee: Kimberly-Clark Corporation, Neenah, Wis.

[21] Appl. No.: 626,817

[22] Filed: Dec. 13, 1990

Related U.S. Application Data

[63] Continuation-in-part of Ser. No. 518,904, May 4, 1990.

[51] Int. Cl.$^5$ .............. B32B 3/10; B32B 5/08; B32B 33/00; D04H 1/74
[52] U.S. Cl. .................. 428/113; 15/209.1; 15/229.11; 19/301; 156/62.4; 156/62.8; 156/176; 156/178; 156/181; 156/308.2; 264/123; 264/210.1; 264/211.12; 428/135; 428/138; 428/141; 428/158; 428/172; 428/179; 428/286
[58] Field of Search .......... 428/286, 288, 296, 71, 428/113, 135, 138, 141, 158, 172, 179, 311.5, 316.6; 156/62.4, 62.8, 176, 178, 181, 308.2; 15/209 R, 209 B; 19/301; 264/123, 210.1, 211.12

[56] References Cited

U.S. PATENT DOCUMENTS

| | | | |
|---|---|---|---|
| 4,211,819 | 7/1990 | Kunimune et al. | 428/374 |
| 4,741,941 | 5/1988 | Englebert et al. | 428/71 |
| 4,761,450 | 8/1988 | Lakshmanan et al. | 524/488 |
| 4,774,277 | 9/1988 | Janac et al. | 524/474 |
| 4,797,318 | 1/1989 | Brooker et al. | 428/283 |
| 4,826,909 | 5/1989 | Lakshmanan et al. | 524/478 |
| 4,830,907 | 5/1989 | Sawyer et al. | 428/225 |
| 4,943,615 | 7/1990 | Yamawaki | 525/240 |

FOREIGN PATENT DOCUMENTS

394524 10/1990 European Pat. Off. .

Primary Examiner—James C. Cannon
Attorney, Agent, or Firm—William D. Herrick

[57] ABSTRACT

There is disclosed a three dimensional nonwoven web consisting of drawn and unoriented thermoplastic fibers formed from a blend of polypropylene and polybutylene, wherein the blend by weight is from 90% to 70% polypropylene and from 10% to 30% polybutylene. The blend can be a blend of a homopolymer of polypropylene and a homopolymer of polybutylene; a homopolymer of polypropylene and a copolymer of polybutylene; a copolymer of polypropylene and a homopolymer of polybutylene; and a copolymer of polypropylene and a copolymer of polybutylene. In addition, ternary blends comprising polypropylene, polybutylene, and terpolymer (propylene, ethylene, and 1-butene) are useful. The resulting nonwoven webs have enhanced strength, toughness, and tear resistance.

67 Claims, 1 Drawing Sheet

Fig_1

THREE-DIMENSIONAL POLYMER WEBS WITH IMPROVED PHYSICAL PROPERTIES

CROSS-REFERENCE TO RELATED APPLICATION

This application is a continuation-in-part of Ser. No. 07/518,904, filed May 4, 1990 is now pending.

BACKGROUND OF THE INVENTION

This invention relates generally to three dimensional nonwoven webs consisting of thermoplastic fibers, and more particularly concerns such webs which are formed from blends of polypropylene and polybutylene.

Nonwoven webs formed of thermoplastic fibers are well-known in the art and have found uses in a variety of applications. In one application, such nonwoven webs are formed by melt-blowing and are used as disposable industrial wipers. Such industrial wipers find application in numerous manufacture and maintenance facilities where personnel find it necessary to wipe up oil, grease, and water from a variety of surfaces. One such wiper made of melt-blown polypropylene fibers is manufactured and sold by Kimberly-Clark Corporation, the assignee of the present invention, under the trademark Kimtex ®.

Melt-blown nonwoven wipers of polypropylene thermoplastics fibers have advantage over cloth wipers in being cost effectively disposable with similar wiping characteristics as compared to cloth. Particularly, industrial wipers must be able to quickly pick up spilled liquids, both oil based and water based, and leave a clean, streak free surface. In addition, the wipers must have sufficient capacity to hold such liquids within the wiper structure until it is desired to remove the liquid by pressure such as by wringing.

Nonwoven melt-blown industrial wipers formed from polypropylene in the past have performed adequately in terms of their wiping characteristics, particularly with respect to oil and, when treated with a surfactant, with respect to water. Moreover, nonwoven industrial wipers made of polypropylene fibers have exhibited resistance to most commercially available solvents.

A superior three dimensional nonwoven melt-blown wiper, however, could be achieved by increasing strength, increasing toughness, and increasing tear resistance. A three dimensional nonwoven web is described in U.S. Pat. No. 4,741,941, to Englebert et al, which is incorporated herein by reference.

As described therein a three dimensional fabric is defined by a pattern of hollow projections extending out of the base plane of the web wherein the fibers or filaments are more aligned than in the land areas between the projections. The projections average in the range generally of from about 1 per square centimeter to about 80 per square centimeter, and they have an average height measured from the base plane to the most extended fibers within the range generally of from about 0.3 millimeters to 25 millimeters. The web is further characterized by an average bulk density in the range generally of from about 0.001 g/cc to about 0.11 g/cc. The fiber diameter may vary generally from about 1 micron to about 100 microns. Other important parameters include the variation in fiber alignment between the web land and projection areas. The projections include fibers or filaments with an average alignment of at least 5° greater than the average alignment of the fibers or filaments in the land areas. Also the webs may be characterized by a volume ratio of volume of the projections to volume contained between the projections in both cases measured between planes at the base and the tops of the projections, in the range of from about 1 to 250. However, the web described in Englebert et al does not teach the increased strength which characterizes a superior three dimensional nonwoven melt-blown wiper.

SUMMARY OF THE INVENTION

It is therefore an object of the present invention to provide a three dimensional nonwoven web consisting of thermoplastic fibers, which web will display improved strength, toughness, and tear resistance over three dimensional melt-blown webs formed of polypropylene and polyethylene fibers.

It is likewise an object of the present invention to provide an industrial wiper comprising a three dimensional nonwoven melt-blown web consisting of thermoplastic fibers which will provide improved strength, toughness, and tear resistance over three dimensional melt-blown wipers formed of polypropylene and polyethylene fibers.

It is also an object of the present invention to provide a laminate material comprising at least one three dimensional layer consisting of thermoplastic fibers which will provide improved strength, toughness, and tear resistance over laminate materials which contain at least one three dimensional layer formed of polypropylene and polyethylene fibers.

It is a further object of the present invention to provide an industrial wiper formed from a laminate material comprising at least one three dimensional layer consisting of thermoplastic fibers which will provide improved strength, toughness, and tear resistance over industrial wipers formed from laminate materials which contain at least one three dimensional layer formed of polypropylene and polyethylene fibers.

The foregoing objectives are obtained by nonwoven webs consisting of drawn and unoriented thermoplastic fibers formed from blends of polypropylene and polybutylene including blends of homopolymers of polypropylene and homopolymers of polybutylene; from blends of homopolymers of polypropylene and copolymers of polybutylene; from blends of copolymers of polypropylene and homopolymers of polybutylene; and from blends of copolymers of polypropylene and copolymers of polybutylene.

In addition, the foregoing objects can be obtained by nonwoven webs consisting of drawn and unoriented thermoplastic fibers formed from a ternary blend comprising polypropylene, polybutylene and a terpolymer comprising propylene, ethylene, and 1-butene.

In connection with the present invention, "drawn thermoplastic fibers" refers to fibers that are drawn to a ratio of greater than 14 to 1 (often greater than 50 to 1) in the forming process. Also in connection with the present invention, "unoriented thermoplastic fibers" refers to fibers which solidify in a relaxed condition (not under tension). Such drawn and unoriented fibers are characteristically formed by melt-blowing techniques as well as other fiber forming techniques such as melt-spraying.

More particularly, the foregoing objectives are realized by a three dimensional nonwoven melt-blown web consisting of drawn and unoriented thermoplastic fibers formed by melt-blowing a blend comprising polypropylene and polybutylene. Particularly, the three dimensional blend of polypropylene and polybutylene is from 90-70% by weight of polypropylene and from 10-30% by weight of polybutylene. More particularly, in the case of a nonwoven wiper, the three dimensional blend is preferred to be from 85% to 75% by weight of polypropylene and from 15% to 25% by weight of polybutylene.

In connection with the present invention, the prior art European Patent Application No. 89303407.4 of Don & Low Ltd. has disclosed the usefulness of blending polypropylene and polybutylene to form fibers, tapes, and films where the thermoplastic fibers, tapes, and films are drawn to a ratio of at least 8:1 to produce an oriented molecular structure. Particularly, the Don & Low reference discloses thermoplastic fibers, tapes, and films that have improved strength as measured by tenacity which is the maximum stress they can resist without rupture. Such thermoplastic fibers, tapes, and films result from blending up to 10% by weight of polybutylene with polypropylene with from 2% to 4% by weight of polybutylene being preferred. The Don & Low reference, however, teaches that "it has been found that if the polybutylene proportion is increased beyond ten percent there is little if any increase in strength [tenacity]". Also the Don & Low reference does not teach improved elongation. As will be demonstrated hereinbelow the nonwoven melt-blown and melt-spray webs of the present invention result from a blend of polypropylene and polybutylene with the polybutylene in excess of 10%. Moreover, the thermoplastic fibers of the present invention are drawn to a ratio of substantially greater than 14 to 1 and are not oriented as a result of the melt-blowing or melt-spraying process.

DETAILED DESCRIPTION OF THE INVENTION

While the invention will be described in connection with a preferred embodiment and procedure, it will be understood that we do not intend to limit the invention to that embodiment or procedure. On the contrary, we intend to cover all alternatives, modifications, and equivalents as may be included within the spirit and scope of the invention as defined by the appended claims.

Figure 1:
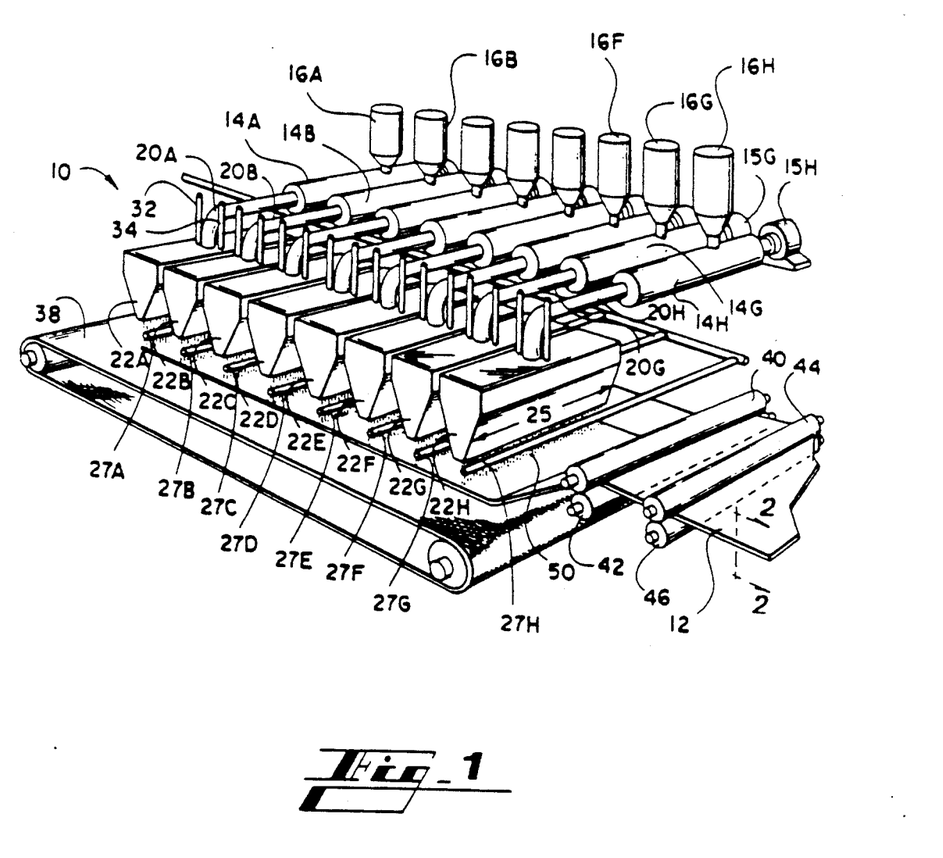
FIG. 1 is a schematic diagram showing machinery for producing a three dimensional nonwoven melt-blown web in accordance with the present invention.

Turning to FIG. 1 there is shown a web forming machine 10 for forming a melt-blown web 12 made up of a number of layers of melt-blown fibers 50. The machine 10 includes eight identical extruders 14A-H with corresponding hoppers 16A-H for receiving thermoplastic resin pellets. The extruders 14A-H include internal screw conveyors which are driven by motors 15A-H. The extruders 14A-H are heated along their lengths to the melting temperature of the thermoplastic resin pellets to form a melt. The screw conveyors driven by motors 15A-H force the thermoplastic material through the extruders into attached delivery pipes 20A-H which are connected to die heads 22A-H, each having a die width 25.

Die head 22A, for example, comprises a die tip 24 which has a die opening or orifice (not shown). The die tip may be recessed, flush, or stick out. Hot fluid, usually air, is supplied to the die tip via pipes 32 and 34 (FIG. 1) which terminate in channels adjacent to the orifice of the die tip.

As the thermoplastic polymer exits the die tip for each die head, the high pressure air attenuates and breaks up the polymer stream to form fibers at each die head. The fibers are then in accordance with the present invention quenched with a mist of water from spray nozzles 27A-H. The spray nozzles are located just below the orifice of the die tip and spray the fibers 50 with water at room temperature or slightly above at a flow rate of at least 0.02 liter/min/inch width of die tip. Fiber quenching is conventional as demonstrated by U. S. Pat. No. 3,959,421. If desired, a surfactant can be added to the fibers by adding the surfactant to the quenching water. It should also be noted that significantly improved toughness and tear resistance result only if the fibers are subjected to quenching.

Once the fibers have been quenched, they are deposited on a forming surface 38 to form the layered web. In the preferred embodiment of the present invention, the forming surface 38 is an open mesh wire surface into which the fibers are pulled in order to form the the three dimensional layer. However, a number of alternative types of forming surfaces 38 may be utilized in order to produce the desired three dimensional layer. A variety of such forming surfaces are described in the Englebert et al patent and are well-known in the art.

A vacuum is drawn behind the forming surface 38 to draw the fibers onto the forming surface 38 during the process of melt-blowing. Separate vacuum chambers behind the forming surface 38 may be provided for each die head 22A-H. Once the fiber layers have been deposited on the forming surface 38 by the multiple die heads 22A-H, the web 12 is drawn from the forming surface 38 by withdrawal rolls 40 and 42. Embossing rolls 44 and 46 engage the web 12 after the withdrawal rolls to emboss the web with a pattern.

The foregoing description of the melt-blowing machine 10 is generally conventional and well-known in the art as demonstrated by NRL Report 4364, "Manufacture of Super-Fine Organic Fibers", by V. A. Wendt, E. L. Boon, and C. D. Fluharty; NRL Report 5265, "An Improved Device for the Formation of Super-Fine Thermoplastic Fibers", by K. D. Lawrence, R. T. Lukas, and J. A. Young; and U.S. Pat. No. 3,849,241, issued Nov. 19, 1974, to Buntin, et al. It also will be appreciated by one of ordinary skill in the art that a single head melt-blowing machine can be used instead of the multiple bank machine illustrated. It should also be appreciated that the web 12 may be comprised of a single layer, multiple layers which are all identical in composition, or multiple layers some of which layers are made in accordance with the present invention and some of which layers are conventional. Moreover, one of ordinary skill in the art will appreciate that fine adjustment of the equipment and process may be required to optimize performance and efficiency. Such fine adjustment can be accomplished by one of ordinary skill without undue experimentation.

In addition, the fibers and the resulting web can be formed by other fiber forming techniques including, for example, melt-spray techniques. Melt-spraying is a process for forming fibers from a fiber forming resin using compact spray head designs usually including one to four spray heads in a cluster. The equipment includes a die housing with a hydraulic chamber and a retractable piston assembly for releasing molten resin. As the mol-

TABLE 1

COMPARISON WITH 100% POLYPROPYLENE
63 POLYMER BLENDS FOR IMPROVED STRENGTHS AND TOUGHNESS IN THREE DIMENSIONAL MELTBLOWN

| Sample Number | Composition | Basis Weight gsm | GRAB TENSILE Load MD g | Load CD g | Energy MD kg-mm | Energy CD kg-mm | Elong MD mm | Elong CD mm | TRAP TEAR Load MD g | Load CD g | NORMALIZED GRAB TENSILE Load MD g/gsm | Load CD g/gsm | NORMALIZED TRAP TEAR Load MD g/gsm | Load CD g/gsm |
|---|---|---|---|---|---|---|---|---|---|---|---|---|---|---|
| 59 | 100% PP | 42 | 1344 | 1453 | 26 | 46 | 30 | 50 | 245 | 227 | 32 | 35 | 6 | 5 |
| 61 | 90:10 PP:PB | 25 | 1544 | 1444 | 73 | 62 | 75 | 72 | 454 | 368 | 63 | 59 | 18 | 15 |
| 62 | 85:15 PP:PB | 41 | 1839 | 1562 | 87 | 70 | 76 | 73 | 558 | 327 | 45 | 38 | 14 | 8 |
| 64 | 80:20 PP:PB | 25 | 1880 | 1775 | 53 | 60 | 46 | 55 | 545 | 381 | 76 | 72 | 22 | 15 |
| 66 | 70:30 PP:PB | 26 | 2393 | 1525 | 52 | 41 | 30 | 42 | 849 | 420 | 91 | 58 | 32 | 16 |

In connection with the characteristics reported in Table 1, the basis weight was measured in accordance with Federal Test Method 191A-5 and expressed in grams per square meter (gsm). The bulk was measured in accordance with the Ames Method and expressed in millimeters (mm). The grab tensile strength was measured in accordance with Method 5100, Federal Test Method 191A and expressed in grams (g), kilogram.millimeters (kg.mm), and millimeters (mm). The trapezoid tear was measured in accordance with Method 5135, Federal Test Method 191 and expressed in grams (g).

In order to measure strength and toughness, the various samples were subjected to tensile testing in the machine direction and the cross-machine direction. Toughness is determined by the amount of energy that the material will absorb prior to failure. The peak energy is the amount of energy the material will absorb until the peak load is achieved. The fail energy is the amount of total energy the material will absorb until it finally fails by separating. Particularly as the stress to which the web is subjected is increased, the web begins stretching or elongating. At some point, the web reaches a peak loading at which failure begins and additional stressing does not increase the loading on the web. As the material begins failing, further elongation results under decreasing loading. The amount of peak energy the material experiences is the integral of the load v. elongation curve for the web from 0 load to the peak of the load. The amount of failed energy is the integral of the load v. elongation curve for the web from the initial 0 load until rupture occurs and the load again returns to 0. Both peak energy and fail energy give a good indication of the toughness of a web. Peak strength is determined by measuring the maximum load achieved before the web begins to fail.

Consequently, it can be seen from Table 1 that Samples 61, 62, 64 and 66, made in accordance with the present invention, all demonstrate a substantial increase in the peak load and energy over those of the prior art 100% three dimensional polypropylene melt-blown web of Sample 59. Particularly, Samples 61, 62, 64 and 66 have an increase in peak load in the cross-machine direction of between 15% and 78% over the control Sample 59. Additionally, Samples 61, 62, 64 and 66 have an increase in peak energy in the machine direction of between 100% and 215% over the control Sample 59. Accordingly, the inventive webs, Samples 61, 62, 64 and 66, all demonstrate the increased strength and toughness of the three dimensional nonwoven webs prepared in accordance with the present invention.

While toughness measures a web's resistance to initial tearing, trapezoid tear measures the web's resistance to the propagation of a tear after an initial tear. As can be seen again from Table 1, Samples 61, 62, 64 and 66 show between a 85% and 247% increase in their tear resistance over that of the control Sample 59.

EXAMPLE 2

Inventive webs, Samples 61, 62, 64 and 66, were next compared to a control web, Sample 2, formed from 100% polyethylene. The polyethylene used for the control web, Sample 2, was a copolymer (with 1-octene) with a melt index of 135 (ASTM D1288, Condition E, (190° C., 2160 g weight)) and a narrow molecular weight distribution. Such a polyethylene homopolymer is manufactured by Dow Chemical, Inc. of Wilmington, Del. and designated ASPUN ® 6814A. The melt-blowing machine was set up in accordance with the following process conditions for Sample 2:

| Machine Configuration: | | |
|---|---|---|
| A. recess die tip | | |
| B. single bank | | |
| C. water quench with surfactant | | |
| Set Points: | | |
| Extruder Barrel Pressure | psi | 504 |
| Primary Air Pressure | psi | 4.2 |
| Primary Air Temperature | °F. | 507 |
| Forming Distance | in | 7.5 |
| Measured Variables: | | |
| Die Tip Pressure | psi | 139 |
| Die Tip (Melt) Temperature | °F. | 507 |

As with Example 1, the actual data for the conventional web, Sample 2, and the inventive webs, Samples 61, 62, 64, and 66, have been normalized to a basis weight of 1 gsm. Both the actual data and the normalized data which show the characteristics of Samples 2, 61, 62, 64, and 66 are set out in Table 2 below.

TABLE 2

COMPARISON WITH 100% POLYETHYLENE
POLYMER BLENDS FOR IMPROVED STRENGTHS AND TOUGHNESS IN THREE DIMENSIONAL MELTBLOWN

| Sample Number | Composition | Basis Weight gsm | GRAB TENSILE Load MD g | Load CD g | Energy MD kg-mm | Energy CD kg-mm | Elong MD mm | Elong CD mm | TRAP TEAR Load MD g | Load CD g | NORMALIZED GRAB TENSILE Load MD g/gsm | Load CD g/gsm | NORMALIZED TRAP TEAR Load MD g/gsm | Load CD g/gsm |
|---|---|---|---|---|---|---|---|---|---|---|---|---|---|---|
| 2 | PE | 40 | 985 | 908 | 44 | 55 | 67 | 97 | | | 25 | 23 | | | ten resin is released, it is contacted and drawn by a primary air supply which completely surrounds the molten resin and contacts it at a predetermined angle. If additional drawing and attenuation of the newly formed fibers is desired, secondary fiberization air also may be utilized. The secondary fiberization air will most typically include at least two fluid streams which each impinge upon the resin/fibers at a second angle.

In more refined embodiments the fiberization air can also be angled such that it will spiral around the forming fibers. Additionally, the piston within the hydraulic chamber may be cycled on and off to interrupt the flow of the fiber forming resin thereby creating discrete pluralities of fibers.

Both melt-blowing and melt-spraying techniques produce fibers that are drawn and unoriented.

In accordance with the present invention, it has been found that an improved three dimensional nonwoven web of drawn and unoriented thermoplastic fibers can be formed by melt-blowing a blend of polypropylene and polybutylene to enhance certain properties in the melt-blown web 12, as compared with 100% three dimensional melt-blown polypropylene and polyethylene. Specifically, the melt-blown web 12 formed from melt-blowing a blend of polypropylene and polybutylene improves the strength, toughness (the elongation and absorbed energy), and tear resistance. Particularly, we have found that blends of from 90% to 70% polypropylene and from 10% to 30% polybutylene produce three dimensional nonwoven melt-blown webs with these improved characteristics. The advantages of the present invention can be realized by blending homopolymers of polypropylene and polybutylene; by blending copolymers of polypropylene and homopolymers of polybutylene; by blending homopolymers of polypropylene and copolymers of polybutylene; and by blending copolymers of polypropylene and copolymers of polybutylene. The copolymers of polypropylene may have ethylene in amounts ranging up to about 3% by weight. The copolymers of polybutylene may have ethylene in amounts ranging up to about 6% by weight.

In addition, the invention may be carried out by using ternary blends comprising polypropylene, polybutylene, and a terpolymer (propylene, ethylene, and 1-butene). The resulting three dimensional nonwoven webs have enhanced strength, toughness, and tear resistance.

Webs in accordance with the present invention can be formed at polymer throughputs of from 1 to 15 pounds per inch of die head width per hour (pih). Once the melt-blown web has been formed, the material may be bonded or unbonded. The bond pattern may be a line pattern, a weave pattern, or a point pattern, but the point pattern, with bonding occurring within certain discrete areas on the material, is preferred. The bonding may be accomplished by ultrasonic heating, by use of an adhesive, or by embossing with heated rolls. In connection with the present invention, most webs described in the following examples were heat embossed with a weave pattern, such as that shown in U.S. Pat. No. Des. 264,512, or with a dot pattern. The resulting bonded webs had a bonded area of about 18% of the total area when embossed with the weave pattern and of 5%–18% when embossed with the dot pattern.

In carrying out the present invention, the blends and ternary blends were formed by simply mixing the thermoplastic pellets in the proper weight proportions before being added to the hoppers 16A–H. The terpolymers were polymerized in the desired proportions during manufacture.

Three dimensional nonwoven webs formed from blends, ternary blends, terpolymers, and terpolymer blends utilizing the present invention were made and tested in accordance with the following examples which illustrate the invention.

EXAMPLE 1

A melt-blowing machine similar to that shown in FIG. 1 was used to form a control web, Sample 59, from 100% polypropylene and four additional webs, Samples 61, 62, 64, and 66, from blends of 90% polypropylene and 10% polybutylene, 85% polypropylene and 15% polybutylene, 80% polypropylene and 20% polybutylene, and 70% polypropylene and 30% polybutylene, respectively. The polypropylene used for the control web, Sample 59, was a homopolymer with a melt flow of 800 g/10 min (ASTM D1288, Condition L, (230° C., 2160 g weight)) and a narrow molecular weight distribution. Such a polypropylene homopolymer is manufactured by Himont U.S.A., Inc of Wilmington, Del. and designated Valtec HH442H. The polypropylene used for the inventive melt-webs, Samples 61, 62, 64, and 66, was also Valtec HH442H. The polybutylene used for Samples 61, 62, 64, and 66 was Duraflex DP-8910, which is an ethylene copolymer (6% ethylene) and is manufactured by Shell Chemical Company of Houston, Tex. The melt-blowing machine was set up in accordance with the following process conditions for Samples 59, 61, 62, 64, and 66:

| Machine Configuration: | | | |
|---|---|---|---|
| A. recess die tip | | | |
| B. single bank | | | |
| C. water quench with surfactant | | | |
| | | Sample 59 | Samples 61–66 |
| Set Points: | | | |
| Extruder Barrel Pressure | psi | 500 | 500 |
| Primary Air Pressure | psi | 2.4 | 2.2 |
| Primary Air Temperature | °F. | 583 | 565 |
| Forming Distance | in | 6.5 | 6.0 |
| Measured Variables: | | | |
| Die Tip Pressure | psi | 21 | 15 |
| Die Tip (Melt) Temperature | °F. | 497 | 489 |

In order to provide an accurate comparison between conventional Sample 59 and inventive Samples 61, 62, 64, and 66, the actual data for the conventional web, Sample 59, and the inventive webs, Samples 61, 62, 64, and 66, has been normalized to a basis weight of 1 gsm. Both the actual data and the normalized data which show the characteristics of Samples 59, 61, 62, 64, and 66 are set out in Table 1 below.

TABLE 2-continued

COMPARISON WITH 100% POLYETHYLENE
POLYMER BLENDS FOR IMPROVED STRENGTHS AND TOUGHNESS IN THREE DIMENSIONAL MELTBLOWN

| Sample Number | Composition | Basis Weight gsm | GRAB TENSILE | | | | | | TRAP TEAR | | NORMALIZED GRAB TENSILE | | NORMALIZED TRAP TEAR | |
|---|---|---|---|---|---|---|---|---|---|---|---|---|---|---|
| | | | Load MD g | Load CD g | Energy MD kg-mm | Energy CD kg-mm | Elong MD mm | Elong CD mm | Load MD g | Load CD g | Load MD g/gsm | Load CD g/gsm | Load MD g/gsm | Load CD g/gsm |
| 61 | 90:10 PP:PB | 25 | 1544 | 1444 | 73 | 62 | 75 | 72 | 454 | 368 | 63 | 59 | 18 | 15 |
| 62 | 85:15 PP:PB | 41 | 1839 | 1562 | 87 | 70 | 76 | 73 | 558 | 327 | 45 | 38 | 14 | 8 |
| 64 | 80:20 PP:PB | 25 | 1880 | 1775 | 53 | 60 | 46 | 55 | 545 | 381 | 76 | 72 | 22 | 15 |
| 66 | 70:30 PP:PB | 26 | 2393 | 1525 | 52 | 41 | 30 | 42 | 849 | 420 | 91 | 58 | 32 | 16 |

It can be seen from Table 2 that Samples 61-66, made in accordance with the present invention, all demonstrate a substantial increase in the peak load and energy over those of the prior art 100% three dimensional polyethylene melt-blown web of Sample 2. Particularly, Samples 61-66 have an increase in peak load in the machine direction of between 57% and 143% over the control Sample 2. Additionally, Samples 61-66 have an increase in peak energy in the machine direction of between 18% and 98% over the control Sample 2. Accordingly, the inventive webs, Samples 61-66, all demonstrate the increased strength and toughness of the three dimensional nonwoven webs prepared in accordance with the present invention.

EXAMPLE 3

In order to determine the effectiveness of the ternary blends of the present invention, Samples 4, 6, 7 and 8 were prepared in accordance with the present invention for comparison with control Samples 2 and 59. Samples 4 and 6 were formed from a blend of 50% polypropylene (homopolymer; Himont HH442H) and 50% terpolymer (formed from three monomers, namely propylene, ethylene, and 1-butene), which was an experimental polymer manufactured by Himont U.S.A., Inc. of Wilmington, Del., identified by the designation EP-5, having a melt flow rate of 45 g/10 min. Samples 7 and 8 are examples of a ternary blend of polymers in accordance with the present invention. Particularly, Samples 7 and 8 were formed from a blend of 45% polypropylene (homopolymer; Himont HH442H), 45% terpolymer (same terpolymer as present in Samples 4 and 6), and 10% polybutylene (Shell DP8910).

Samples 4, 6, 7, and 8 were formed by melt-blowing in accordance with the following parameters:

Machine Configuration:

-continued

A. recess die tip
B. single bank
C. water quench with surfactant

| | | Samples 4/6 | Samples 7/8 |
|---|---|---|---|
| Set Points: | | | |
| Primary Air Pressure | psi | 3 | 2.5 |
| Primary Air Temperature | °F. | 623 | 635 |
| Forming Distance | in | 7 | 7 |
| Measured Variables: | | | |
| Die Tip Pressure | psi | 125 | 128 |
| Die Tip (Melt) Temperature | °F. | 579 | 557 |

As with the previous examples, the actual data for the inventive webs, Samples 4, 6, 7, and 8, have been normalized to a basis weight of 1 gsm. Both the actual data and the normalized data which show the characteristics of Samples 2, 4, 6, 7, 8, and 59 are set out in Table 3 below.

TABLE 3

COMPARISON WITH TRIBLEND PP:PB:TERPOLYMER
POLYMER BLENDS FOR IMPROVED STRENGTHS AND TOUGHNESS
IN THREE DIMENSIONAL MELTBLOWN

| Sample Number | Composition | Basis Weight gsm | GRAB TENSILE | | | | | | NORMALIZED GRAB TENSILE | |
|---|---|---|---|---|---|---|---|---|---|---|
| | | | Load MD g | Load CD g | Energy MD kg-mm | Energy CD kg-mm | Elong MD mm | Elong CD mm | Load MD g/gsm | Load CD g/gsm |
| 7 & 8 | 45:45:10 PP:TERP:PB | 41 | 1871 | 1738 | 85 | 98 | 63 | 85 | 46 | 42 |
| 4 & 6 | 50:50 PP:TERP | 41 | 2395 | 1841 | 53 | 67 | 28 | 51 | 59 | 45 |
| 59 | 100% PP | 42 | 1344 | 1453 | 26 | 46 | 30 | 50 | 32 | 35 |
| 2 | 100% PE | 40 | 985 | 908 | 44 | 55 | 67 | 97 | 25 | 23 |

It can be seen from Table 3 that although Samples 4 and 6, made in accordance with the present invention, demonstrate a substantial increase in the peak load and energy over those of the prior art three dimensional melt-blown webs of Samples 2 and 59, the polypropylene/terpolymer blend has a decreased elongation, which is an important characteristic of toughness. To the contrary, Samples 7 and 8 demonstrate increased strength, toughness, and elongation. Particularly, Samples 7 and 8 have an increase in peak load in the machine direction of between 39% and 90% over the control Samples 2 and 59. Additionally, Samples 7 and 8 have an increase in peak energy in the machine direction of between 93% and 227% over the control Samples 2 and 59, an increase in elongation of between 70% and 110% compared with control Sample 59, and a comprable elongation with that of control Sample 2. Accordingly, the inventive ternary blend webs, Samples 7 and 8, demonstrate the increased strength and toughness of the three dimensional nonwoven webs prepared in accordance with the present invention.

EXAMPLE 4

In order to test the effectiveness of the three dimensional web of the present invention as a laminate material, Samples 53, 56, 213, C, D were prepared in accordance with the present invention. Each of these samples was bonded to an intermediate layer of material which was not the three dimensional web of the present invention.

Samples 55 and 207 were also prepared to show the effectiveness of the three dimensional web of the present invention as a laminate material in situations where the three dimensional web will be directly bonded to another three dimensional web, without any intermediate layer.

Sample 53 was formed from a blend of 60% polyethylene (Dow 6814) and 40% polypropylene. The polypropylene used for Sample 53 was a homopolymer with a melt flow of 400 g/10 min (ASTM D1288, Condition L, (230° C., 2160 g weight)) and a narrow molecular weight distribution. Such a polypropylene homopolymer is manufactured by Himont U.S.A., Inc. of Wilmington, Del. and designated HH441. Sample 56 was formed from a blend of 75% polyethylene (Dow 6814) and 25% polypropylene (Himont HH441). As an intermediate material to which the laminate materials of Samples 53 and 56 were bonded, Intermediate Layer X was formed from a blend of 60% pulp (IPSS) and 40% ethylene vinyl acetate copolymer (Exxon "Escorene").

Sample 213 was formed from a blend of 25% polybutylene (Shell DP8910) and 75% polypropylene (Himont HH442H) and was bonded to an intermediate material "X," formed from a blend of 70% pulp (IPSS) and 30% ethylene vinyl acetate copolymer (Exxon "Escorene").

Sample C was formed from a blend of 80% polypropylene (Himont HH442H) and 20% polybutylene (Shell DP8910) which was bonded to an intermediate material "X," formed from a blend of 30% pulp (Weyerhauser NF105) and 70% polymer blend (comprised of 85% polypropylene (Himont HH442H) and 15% polybutylene (Shell DP8910)).

Sample D was formed from a blend of 80% polypropylene (Himont HH442H) and 20% polybutylene (Shell DP8910) which was bonded to an intermediate material "X," formed from a blend of 50% pulp (Weyerhauser NF105) and 50% polymer blend (comprised of 85% polypropylene (Himont HH442H) and 15% polybutylene (Shell DP8910)).

Sample 55 was formed from a blend of 75% polyethylene (Dow 6814) and 25% polypropylene (Himont HH442H). Sample 207 was formed from a blend of 80% polypropylene (Himont HH442H) and 20% polybutylene (Shell DP8910).

All the webs were heat embossed with a conventional bonding pattern.

Samples 53, 56, 213, C, D, 55, and 207 were formed by melt-blowing in accordance with the following parameters:

| Machine Configuration: |
| --- |
| A. recess die tip |
| B. single bank |
| C. water quench with surfactant |

| | | 3D Layer Sample 53 | Intermediate Layer X |
| --- | --- | --- | --- |
| Primary Air Pressure | psi | 1.5 | 4.6 |
| Primary Air Temperature | °F. | 512 | 404 |
| Forming Distance | in | 6.5 | 9 |
| Primary Air Flow | scfm | 168 | |
| Measured Variables: | | | |
| Die Tip Pressure | psi | 132 | |
| Die Tip (Melt) Temperature | °F. | 589 | 381 |
| Bonding | | | |
| Pattern Roll Temperature | | | |
| Set Point | °F. | 180 | |
| Actual Surface | °F. | 160 | |
| Anvil Roll Temperature | | | |
| Set Point | °F. | 180 | |
| Actual Surface | °F. | 170 | |
| Pressure (Average) | psi | 10 | |
| Line Speed | fpm | 14 | |

| | | 3D Layer Sample 56 | Intermediate Layer X |
| --- | --- | --- | --- |
| Primary Air Pressure | psi | | 4.6 |
| Primary Air Temperature | °F. | 545 | 404 |
| Forming Distance | in | | 9 |
| Primary Air Flow | scfm | 400 | |
| Measured Variables: | | | |
| Die Tip Pressure | psi | 174 | |
| Die Tip (Melt) Temperature | °F. | 538 | 381 |
| Bonding | | | |
| Pattern Roll Temperature | | | |
| Set Point | °F. | 180 | |
| Actual Surface | °F. | 160 | |
| Anvil Roll Temperature | | | |
| Set Point | °F. | 180 | |
| Actual Surface | °F. | 170 | |
| Pressure (Average) | psi | 10 | |
| Line Speed | fpm | 14 | |

| | | 3D Layer Sample 213 | Intermediate Layer X |
| --- | --- | --- | --- |
| Primary Air Pressure | psi | 2.3 | 5.0 |
| Primary Air Temperature | °F. | 511 | 380 |
| Forming Distance | in | 7.5 | |
| Primary Air Flow | scfm | 66 | |
| Measured Variables: | | | |
| Die Tip Pressure | psi | | 220 |
| Die Tip (Melt) Temperature (and Triton X-102 surfactant quench) | °F. | 536 | 370 |
| Bonding | | | |
| Pattern Roll Temperature | | | |
| Set Point | °F. | 185 | |
| Actual Surface | °F. | 160 | |
| Anvil Roll Temperature | | | |
| Set Point | °F. | 190 | |
| Actual Surface | °F. | 173 | |
| Pressure (Average) | psi | 12.5 | |
| Line Speed | fpm | 21 | |

| | | 3D Layer Sample C | Intermediate Layer X |
| --- | --- | --- | --- |
| Primary Air Pressure | psi | 1.6 | 6.3 |
| Primary Air Temperature | °F. | 517 | 514 |
| Forming Distance | in | 7 | 18 |
| Primary Air Flow | scfm | | |
| Measured Variables: | | | |
| Die Tip Pressure | psi | 79 | 117 |
| Die Tip (Melt) Temperature (and Triton X-102 surfactant quench) | °F. | 495 | 514 |
| Bonding | | | |
| Pattern Roll Temperature | | | |
| Set Point | °F. | 220 | |
| Actual Surface | °F. | | |
| Anvil Roll Temperature | | | |
| Set Point | °F. | 230 | |
| Actual Surface | °F. | | |

-continued

| | | |
|---|---|---|
| Pressure (Average) | psi | 16 |
| Line Speed | fpm | 22 |
| | 3D Layer | Intermediate Layer |

As with the previous examples, the data for these inventive samples were all normalized to a basis weight of 1 gsm. Both the actual data and the normalized data which show the characteristics of these inventive samples are set out in Table 4 below.

TABLE 4

COMPARISON OF COMPOSITES WITH 3D OUTER LAYERS
63 POLYMER BLENDS FOR IMPROVED STRENGTHS AND TOUGHNESS IN THREE DIMENSIONAL MELTBLOWN

| | | | GRAB TENSILE | | | | | | TRAP TEAR | | NORMALIZED GRAB TENSILE | | NORMALIZED TRAP TEAR | |
|---|---|---|---|---|---|---|---|---|---|---|---|---|---|---|
| Sample Number | Composition | Basis Weight gsm | Load MD g | Load CD g | Energy MD kg-mm | Energy CD kg-mm | Elong MD mm | Elong CD mm | Load MD g | Load CD g | Load MD g/gsm | Load CD g/gsm | Load MD g/gsm | Load CD g/gsm |
| 3D + x + 3D | | | | | | | | | | | | | | |
| 53 | 3D = 60:40 PE:PP x = 60:40 PULP:EVA | 80 | 1895 | 1960 | 85 | 98 | 69 | 80 | 539 | 647 | 24 | 25 | 7 | 8 |
| 56 | 3D = 75:25 PE:PP x = 60:40 PULP:EVA | 103 | 1651 | 1878 | 39 | 77 | 26 | 40 | 522 | 270 | 16 | 18 | 5 | 3 |
| 213 | 3D = 75:25 PE:PB x = 70:30 PULP:EVA | 88 | 2301 | 2117 | 145 | 161 | 85 | 97 | 828 | 816 | 26 | 24 | 9 | 9 |
| C | 3D = 80:20 PP:PB 3D x = 30:70 PULP: (85:15 PP:PB) | 111 | 5269 | 4272 | 175 | 182 | 44 | 63 | 1221 | 653 | 47 | 38 | 11 | 6 |
| D | 3D = 80:20 PP:PB 3D x = 30:70 PULP: (85:15 PP:PB) | 112 | 4217 | 3314 | 117 | 108 | 38 | 46 | 980 | 648 | 38 | 30 | 9 | 6 |
| 3D + 3D (no intermediate layer) | | | | | | | | | | | | | | |
| 55 | 3D = 75:25 PE:PP | 76 | 2118 | 1689 | 63 | 32 | 31 | 29 | 573 | 226 | 28 | 22 | 8 | 3 |
| 207 | 3D = 80:20 PE:PB | 50 | 2334 | 1856 | 111 | 108 | 71 | 89 | 892 | 661 | 47 | 37 | 18 | 13 |

| | | D | X |
|---|---|---|---|
| Primary Air Pressure | psi | 1.6 | 6.3 |
| Primary Air Temperature | °F. | 517 | 514 |
| Forming Distance | in | 7 | 18 |
| Primary Air Flow | scfm | | |
| Measured Variables: | | | |
| Die Tip Pressure | psi | 79 | 117 |
| Die Tip (Melt) Temperature (and Triton X-102 surfactant quench) | °F. | 495 | 514 |
| Bonding | | | |
| Pattern Roll Temperature | | | |
| Set Point | °F. | 220 | |
| Actual Surface | °F. | | |
| Anvil Roll Temperature | | | |
| Set Point | °F. | 230 | |
| Actual Surface | °F. | | |
| Pressure (Average) | psi | 16 | |
| Line Speed | fpm | 22 | |

| | | 3D Layer 55 | Intermediate Layer 207 |
|---|---|---|---|
| Primary Air Pressure | psi | | 1.5 |
| Primary Air Temperature | °F. | 545 | 522 |
| Forming Distance | in | | 7 |
| Primary Air Flow | scfm | 400 | 195 |
| Measured Variables: | | | |
| Die Tip Pressure | psi | 174 | 56 |
| Die Tip (Melt) Temperature (and Triton X-102 surfactant quench) | °F. | 538 | 502 |
| Bonding | | | |
| Pattern Roll Temperature | | | |
| Set Point | °F. | 180 | 237 |
| Actual Surface | °F. | 160 | 207 |
| Anvil Roll Temperature | | | |
| Set Point | °F. | 180 | 224 |
| Actual Surface | °F. | 170 | 202 |
| Pressure (Average) | psi | 10 | 22 |
| Line Speed | fpm | 14 | 39 |

It can be seen from Table 4 that the laminate material formed from polyethylene, namely samples 53 and 56, do not exhibit the same strength, toughness, and tear resistance as those formed from polybutylene, namely Samples 213, C, and D. In particular, the polybutylene laminate materials bonded to an intermediate layer have an increase in peak load in the machine direction of 121% on average over the polyethylene laminate materials. Additionally, these polybutylene laminate materials have an increase in peak energy in the machine direction of 135% on average over the polyethylene laminate materials. Accordingly, the inventive laminate materials containing polybutylene, Samples 213, C, and D demonstrate the increased strength and toughness of the three dimensional nonwoven webs prepared in accordance with the present invention.

As can also be seen from Table 4, Samples 213, C, and D formed with polybutylene, show much greater tear resistance than the samples formed with polyethylene.

It can also be seen from Table 4 that the three dimensional layer formed with polybutylene, Sample 207, had a 10% greater peak load than the three dimensional layer formed with polyethylene, Sample 55. As for peak energy, Sample 207 was 76% greater than Sample 55. Additionally, Sample 207's tear resistance was 56% greater than the tear resistance of Sample 55. It should be noted that there was no intermediate layer bonded between the two three dimensional layers of Samples 207 and 55.

We claim:

1. A three dimensional nonwoven web comprising at least one layer consisting of drawn and unoriented thermoplastic fibers formed from a blend comprising polypropylene and polybutylene, wherein the blend by weight is from 90% to 70% polypropylene and from 10% to 30% polybutylene.

2. The three dimensional nonwoven web of claim 1, wherein the polypropylene is selected from the group consisting of polypropylene homopolymers and polypropylene copolymers and the polybutylene is selected from the group consisting of polybutylene homopolymers and polybutylene copolymers.

3. The three dimensional nonwoven web of claim 2, wherein the polypropylene copolymer and the polybutylene copolymer are copolymers of ethylene.

4. A three dimensional nonwoven web comprising at least one layer consisting of drawn thermoplastic fibers formed from a ternary blend comprising polypropylene, polybutylene, and a terpolymer, wherein the ternary blend by weight is from 10% to 30% polybutylene.

5. The three dimensional nonwoven web of claim 4, wherein the terpolymer comprises propylene, ethylene, and 1-butene.

6. The three dimensional nonwoven web of claim 4, wherein the polypropylene is selected from the group consisting of polypropylene homopolymers and polypropylene copolymers and the polybutylene is selected from the group consisting of polybutylene homopolymers and polybutylene copolymers.

7. The three dimensional nonwoven web of claim 6, wherein the polypropylene copolymer and the polybutylene copolymer are copolymers of ethylene.

8. A method for forming a layer of three dimensional nonwoven web consisting of thermoplastic fibers, comprising the steps of:
   a. mixing polypropylene and polybutylene to form a blend, wherein the blend by weight is from 90% to 70% polypropylene and from 10% to 30% polybutylene;
   b. heating the blend to form a melt;
   c. extruding the melt through an orifice to form thermoplastic fibers;
   d. initially drawing the fibers to a ratio of greater than 14 to 1; and
   e. depositing the fibers onto a forming surface to form a first layer.

9. The method of claim 8, wherein the fibers are quenched prior to being deposited on the forming surface.

10. The method of claim 8 or 9, wherein after the fibers are deposited, the layer is bonded.

11. The method of claim 8 or 9, wherein the polypropylene is selected from the group consisting of polypropylene homopolymers and polypropylene copolymers and the polybutylene is selected from the group consisting of polybutylene homopolymers and polybutylene copolymers.

12. The method of claim 11, wherein the polypropylene copolymer and the polybutylene copolymer are copolymers of ethylene.

13. A method for forming a layer of three dimensional nonwoven web consisting of thermoplastic fibers, comprising the steps of:
   a. mixing polypropylene, polybutylene, and a terpolymer to form a ternary blend, wherein the ternary blend by weight is from 10% to 30% polybutylene;
   b. heating the ternary blend to form a melt;
   c. extruding the melt through an orifice to form thermoplastic fibers;
   d. initially drawing the fibers to a ratio of greater than 14 to 1; and
   e. depositing the fibers onto a forming surface to form a first layer.

14. The method of claim 13, wherein the terpolymer comprises propylene, ethylene, and 1-butene.

15. The method of claim 13, wherein the polypropylene is selected from the group consisting of polypropylene homopolymers and polypropylene copolymers and the polybutylene is selected from the group consisting of polybutylene homopolymers and polybutylene copolymers.

16. The method of claim 15, wherein the polypropylene copolymer and the polybutylene copolymer are copolymers of ethylene.

17. The method of claim 13 or 14, wherein the fibers are quenched prior to being deposited on the forming surface.

18. The method of claim 17, wherein after the fibers are deposited, the layer is bonded.

19. A three dimensional nonwoven wiper comprising a web consisting of drawn thermoplastic fibers, wherein the fibers are formed from a blend comprising polypropylene and polybutylene to form thermoplastic fibers wherein the blend by weight is from 90% to 70% polypropylene and from 10% to 30% polybutylene.

20. The three dimensional nonwoven wiper of claim 19, wherein the polypropylene is selected from the group consisting of polypropylene homopolymers and polypropylene copolymers and the polybutylene is selected from the group consisting of polybutylene homopolymers and polybutylene copolymers.

21. The three dimensional nonwoven wiper of claim 20, wherein the polypropylene copolymer and the polybutylene copolymer are copolymers of ethylene.

22. A three dimensional nonwoven wiper consisting of drawn thermoplastic fibers formed from a ternary blend comprising polypropylene, polybutylene, and a terpolymer wherein the ternary blend by weight is from 10% to 30% polybutylene.

23. The three dimensional nonwoven wiper of claim 22, wherein the terpolymer comprises propylene, ethylene, and 1-butene.

24. The three dimensional nonwoven wiper of claim 22, wherein the polypropylene is selected from the group consisting of polypropylene homopolymers and polypropylene copolymers and the polybutylene is selected from the group consisting of polybutylene homopolymers and polybutylene copolymers.

25. The three dimensional nonwoven wiper of claim 24, wherein the polypropylene copolymer and the polybutylene copolymer are copolymers of ethylene.

26. A method for forming a three dimensional nonwoven wiper consisting of thermoplastic fibers comprising the steps of:
   a. mixing polypropylene and polybutylene to form a blend, wherein the blend by weight is from 90% to 70% polypropylene and from 10% to 30% polybutylene;
   b. heating the blend to form a melt;
   c. extruding the melt through an orifice to form thermoplastic fibers;
   d. initially drawing the fibers to a ratio of greater than 14 to 1; and
   e. depositing the fibers onto a forming surface to form a first layer.

27. The method of claim 26, wherein the fibers are quenched prior to being deposited on the forming surface.

28. The method of claim 26 or 27, wherein after the fibers are deposited, the wiper is bonded.

29. The method of claim 26 or 27, wherein the polypropylene is selected from the group consisting of polypropylene homopolymers and polypropylene copolymers and the polybutylene is selected from the group consisting of polybutylene homopolymers and polybutylene copolymers.

30. The three dimensional nonwoven web of claim 29, wherein the polypropylene copolymer and the polybutylene copolymer are copolymers of ethylene.

31. A method for forming a three dimensional nonwoven wiper consisting of thermoplastic fibers comprising the steps of:
   a. mixing polypropylene, polybutylene, and a terpolymer to form a ternary blend, wherein the ternary blend by weight is from 10% to 30% polybutylene;
   b. heating the ternary blend to form a melt;
   c. extruding the melt through an orifice to form thermoplastic fibers;
   d. initially drawing the fibers to a ratio of greater than 14 to 1; and
   e. depositing the fibers onto a forming surface to form a first layer.

32. The method of claim 31, wherein the terpolymer comprises propylene, ethylene, and 1-butene.

33. The method of claim 31, wherein the polypropylene is selected from the group consisting of polypropylene homopolymers and polypropylene copolymers and the polybutylene is selected from the group consisting of polybutylene homopolymers and polybutylene copolymers.

34. The method of claim 33, wherein the polypropylene copolymer and the polybutylene copolymer are copolymers of ethylene.

35. The method of claim 31 or 32, wherein the fibers are quenched prior to being deposited on the forming surface.

36. The method of claim 35, wherein after the fibers are deposited, the wiper is bonded.

37. A laminate material comprising at least one three dimensional layer consisting of drawn and unoriented thermoplastic fibers formed from a blend comprising polypropylene and polybutylene, wherein the blend by weight is from 90% to 70% polypropylene and from 10% to 30% polybutylene.

38. The laminate material of claim 37, wherein the polypropylene is selected from the group consisting of polypropylene homopolymers and polypropylene copolymers and the polybutylene is selected from the group consisting of polybutylene homopolymers and polybutylene copolymers.

39. The laminate material of claim 38, wherein the polypropylene copolymer and the polybutylene copolymer are copolymers of ethylene.

40. A laminate material comprising at least one three dimensional layer consisting of drawn thermoplastic fibers formed from a ternary blend comprising polypropylene, polybutylene, and a terpolymer, wherein the ternary blend by weight is from 10% to 30% polybutylene.

41. The laminate material of claim 40, wherein the terpolymer comprises propylene, ethylene, and 1-butene.

42. The laminate material of claim 40, wherein the polypropylene is selected from the group consisting of polypropylene homopolymers and polypropylene copolymers and the polybutylene is selected from the group consisting of polybutylene homopolymers and polybutylene copolymers.

43. The laminate material of claim 42, wherein the polypropylene copolymer and the polybutylene copolymer are copolymers of ethylene.

44. A method for forming a laminate material comprising at least one three dimensional layer consisting of thermoplastic fibers, comprising the steps of:
   a. mixing polypropylene and polybutylene to form a blend, wherein the blend by weight is from 90% to 70% polypropylene and from 10% to 30% polybutylene;
   b. heating the blend to form a melt;
   c. extruding the melt through an orifice to form thermoplastic fibers;
   d. initially drawing the fibers to a ratio of greater than 14 to 1; and
   e. depositing the fibers onto a forming surface to form a first layer.

45. The method of claim 44, wherein the fibers are quenched prior to being deposited on the forming surface.

46. The method of claim 44 or 45, wherein after the fibers are deposited, the first layer is bonded.

47. The method of claim 44 or 45, wherein the polypropylene is selected from the group consisting of polypropylene homopolymers and polypropylene copolymers and the polybutylene is selected from the group consisting of polybutylene homopolymers and polybutylene copolymers.

48. The method of claim 47, wherein the polypropylene copolymer and the polybutylene copolymer are copolymers of ethylene.

49. The method of claim 48, wherein the first layer is bonded to a second layer selected from the group of materials consisting of foam, meltblown, coform, spunbond, scrim, and three dimensional meltblown.

50. The method of claim 49, wherein the second layer is bonded to a third layer.

51. The method of claim 50, wherein the second layer is bonded to a third layer selected from the group of materials consisting of foam, meltblown, coform, spunbond, scrim, and three dimensional meltblown.

52. A method for forming a laminate material comprising at least one three dimensional layer consisting of thermoplastic fibers, comprising the steps of:
   a. mixing polypropylene, polybutylene, and a terpolymer to form a ternary blend, wherein the ternary blend by weight is from 10% to 30% polybutylene;
   b. heating the ternary blend to form a melt;
   c. extruding the melt through an orifice to form thermoplastic fibers;
   d. initially drawing the fibers to a ratio of greater than 14 to 1; and
   e. depositing the fibers onto a forming surface to form a first layer.

53. The method of claim 52, wherein the terpolymer comprises propylene, ethylene, and 1-butene.

54. The method of claim 52, wherein the polypropylene is selected from the group consisting of polypropylene homopolymers and polypropylene copolymers and the polybutylene is selected from the group consisting of polybutylene homopolymers and polybutylene copolymers.

55. The laminate material of claim 54, wherein the polypropylene copolymer and the polybutylene copolymer are copolymers of ethylene.

56. The method of claim 52 or 53, wherein the fibers are quenched prior to being deposited on the forming surface.

57. The method of claim 56, wherein after the fibers are deposited, the first layer is bonded.

58. The method of claim 57, wherein the first layer is bonded to a second layer selected from the group of materials consisting of foam, meltblown, coform, spunbond, scrim, and three dimensional meltblown.

59. The method of claim 58, wherein the second layer is bonded to a third layer.

60. The method of claim 59, wherein the second layer is bonded to a third layer selected from the group of materials consisting of foam, meltblown, coform, spunbond, scrim, and three dimensional meltblown.

61. A three dimensional nonwoven wiper comprising a laminate material comprising at least one three dimensional layer consisting of drawn and unoriented thermoplastic fibers formed from a blend comprising polypropylene and polybutylene, wherein the blend by weight is from 90% to 70% polypropylene and from 10% to 30% polybutylene.

62. The three dimensional nonwoven wiper of claim 61, wherein the polypropylene is selected from the group consisting of polypropylene homopolymers and polypropylene copolymers and the polybutylene is selected from the group consisting of polybutylene homopolymers and polybutylene copolymers.

63. The three dimensional nonwoven wiper of claim 62, wherein the polypropylene copolymer and the polybutylene copolymer are copolymers of ethylene.

64. A three dimensional nonwoven wiper comprising a laminate material comprising at least one three dimensional layer consisting of drawn thermoplastic fibers formed from a ternary blend comprising polypropylene, polybutylene, and a terpolymer, wherein the ternary blend by weight is from 10% to 30% polybutylene.

65. The three dimensional nonwoven wiper of claim 64, wherein the terpolymer comprises propylene, ethylene, and 1-butene.

66. The three dimensional nonwoven wiper of claim 64, wherein the polypropylene is selected from the group consisting of polypropylene homopolymers and polypropylene copolymers and the polybutylene is selected from the group consisting of polybutylene homopolymers and polybutylene copolymers.

67. The three dimensional nonwoven wiper of claim 66, wherein the polypropylene copolymer and the polybutylene copolymer are copolymers of ethylene.

* * * * *

UNITED STATES PATENT AND TRADEMARK OFFICE
CERTIFICATE OF CORRECTION

PATENT NO. : 5,165,979

DATED : November 24, 1992

INVENTOR(S) : S. L. Watkins and H. P. Watts

It is certified that error appears in the above-identified patent and that said Letters Patent is hereby corrected as shown below:

Column 1, line 9, after "May 4, 1990" --is now pending-- should be deleted.

Column 4, line 23, "to form the the three" should read --to form the three--.

Column 6, lines 48-49, "Samples 59 and 61-66" should be under and to the right of "Set Points".

Column 7, Table I, "63 Polymer Blends" should read --Polymer Blends--.

Column 7, line 21, "kilogram.millimeters" should read --kilogram•millimeters--.

Columns 7/8, Table 2, please line up "Grab Tensile, Trap Tear, Normalized Grab Tensile";

Columns 9/10, Table 2, please line up "Grab Tensile, Trap Tear, Normalized Grab Tensile".

Columns 9/10, Table 3, should not split paragraph in Column 9.

Column 9, lines 67-68, please remove "Machine Configuration:" so that this does not split from table.

UNITED STATES PATENT AND TRADEMARK OFFICE
CERTIFICATE OF CORRECTION

PATENT NO. : 5,165,979

DATED : November 24, 1992

INVENTOR(S) : S. L. Watkins and H. P. Watts

It is certified that error appears in the above-identified patent and that said Letters Patent is hereby corrected as shown below:

Column 10, Table 3, please line up "Grab Tensile and Normalized Grab Tensile".

Column 11, line 69, please move "Intermediate" up to column 12 so it does not split from table.

Columns 13/14, Table 4, "Table 4 should not break up, other table in Column 13";

"63 Polymer Blends For" should read --Polymer Blends For--;

"213 3D=75:25 PE:PB" should read --213 3D=75:25 PP:PB--;

"In sample C please move the 3D that comes after PB under the 80";

"In sample D please move the 3D so that it comes after PB under the 80";

"207 3D=80:20 PE:PB" should read --207 3D=80:20 PP:PB--.

Signed and Sealed this

First Day of November, 1994

BRUCE LEHMAN

*Attest:*

*Attesting Officer*     *Commissioner of Patents and Trademarks*